Patented Nov. 25, 1924.

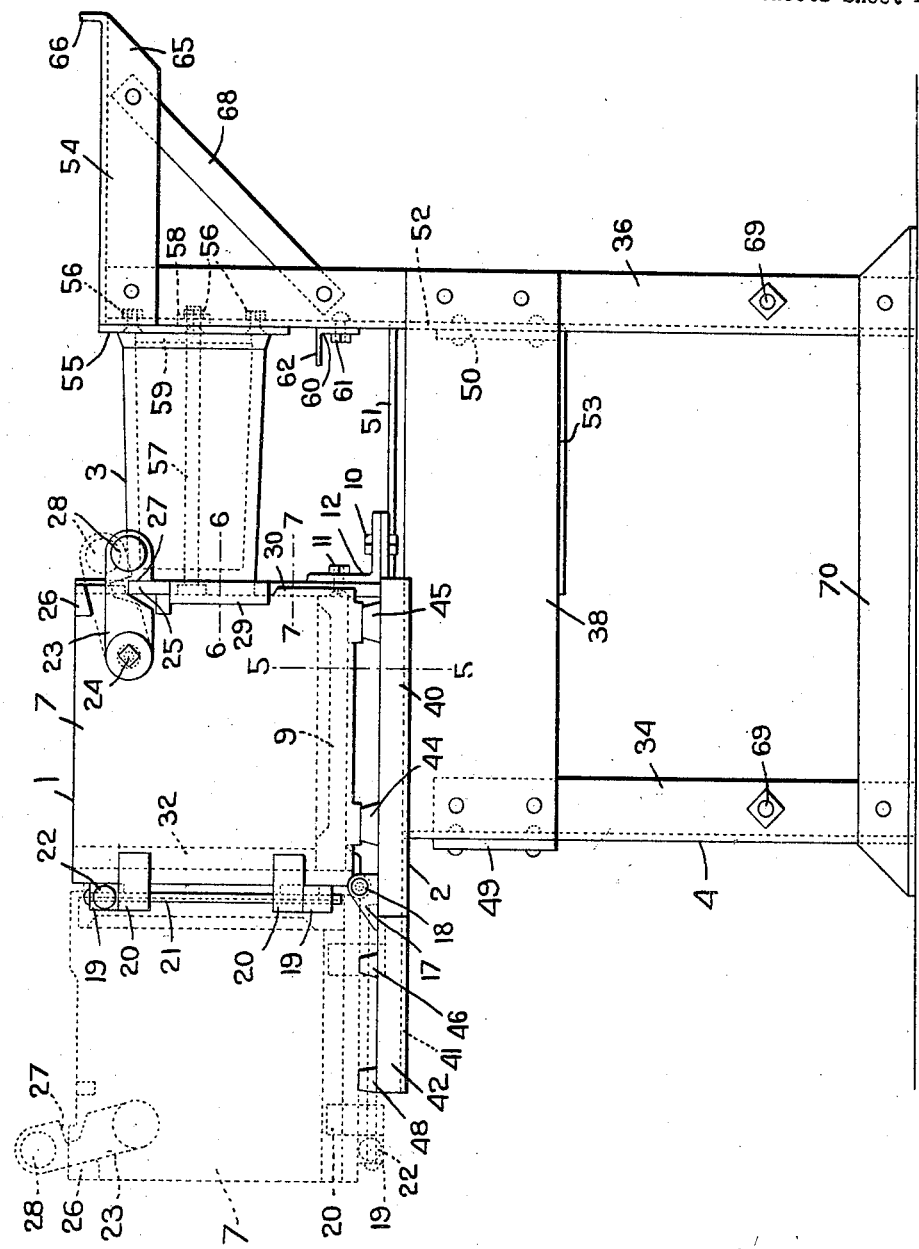

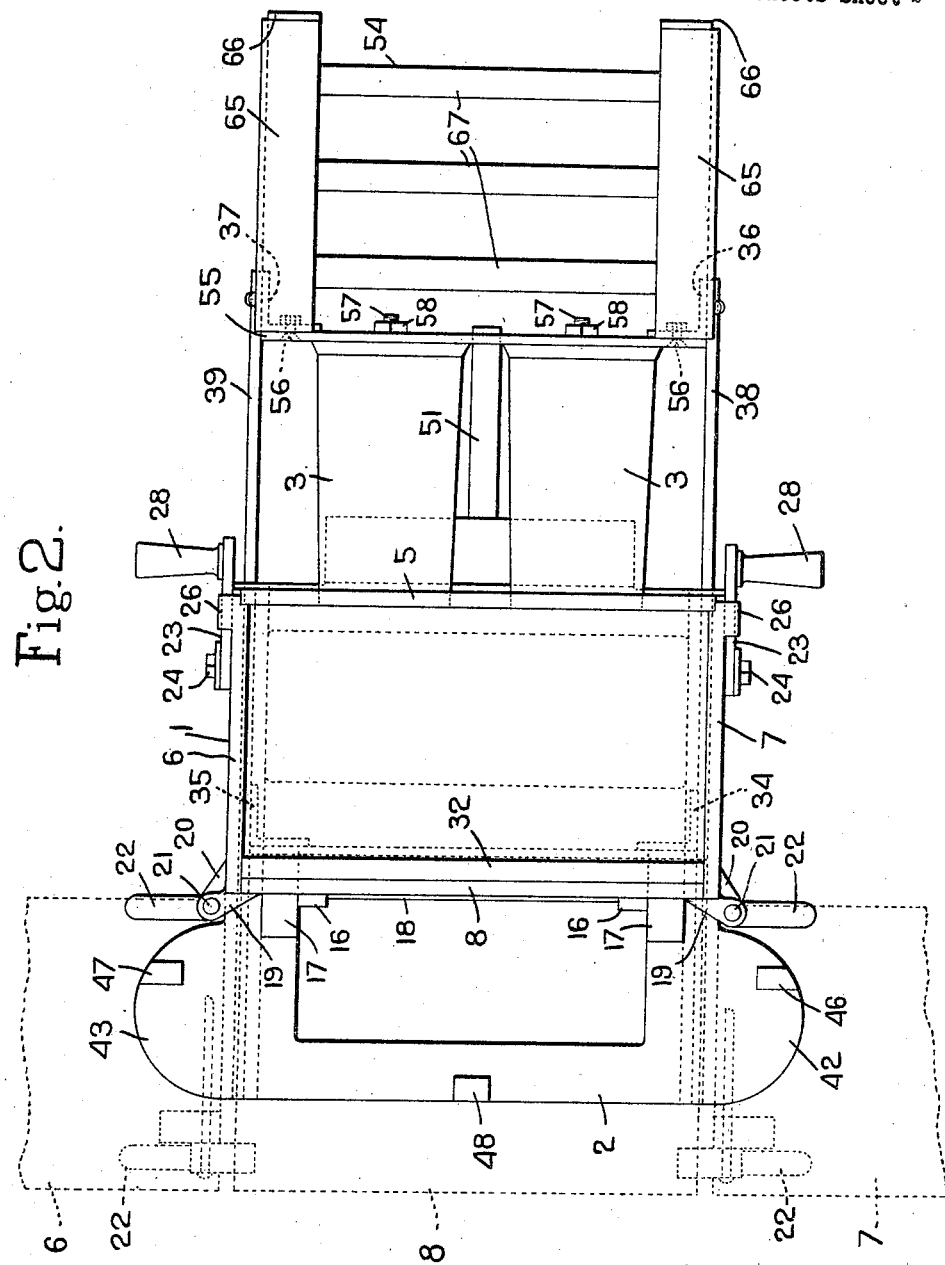

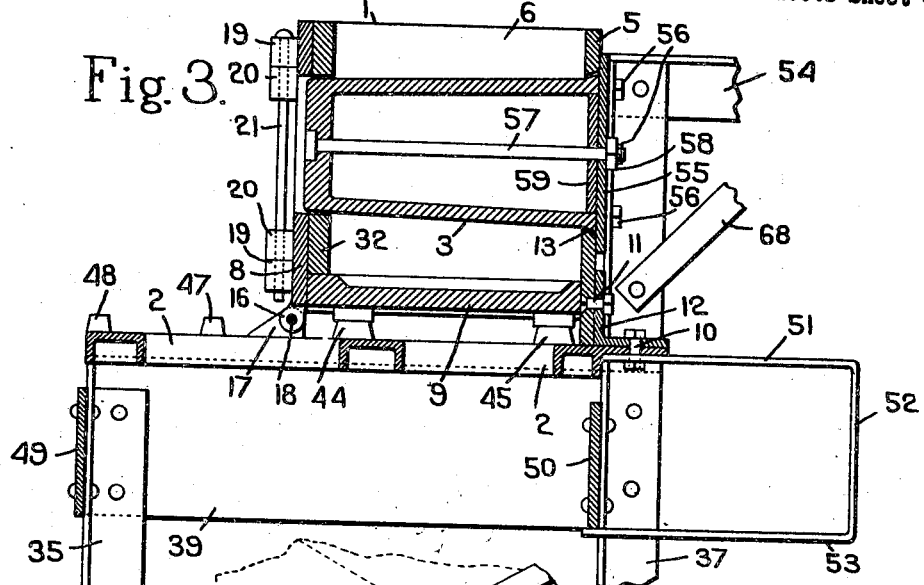
Nov. 25, 1924.
L. CAPUTO
1,516,710
CONCRETE BLOCK MOLDING MACHINE
Filed July 18, 1923   3 Sheets-Sheet 3
Inventor
Louis Caputo
by Heard Smith & Tennant
Attys.

1,516,710

UNITED STATES PATENT OFFICE.

LOUIS CAPUTO, OF EAST BOSTON, MASSACHUSETTS.

CONCRETE-BLOCK-MOLDING MACHINE.

Application filed July 18, 1923. Serial No. 652,255.

*To all whom it may concern:*

Be it known that I, LOUIS CAPUTO, a citizen of the United States, and resident of East Boston, county of Suffolk, State of Massachusetts, have invented an Improvement in Concrete-Block-Molding Machines, of which the following description, in connection with the accompanying drawing, is a specification, like characters on the drawing representing like parts.

This invention relates to a concrete block molding machine of the type in which the mold is movable toward and away from the core and the sides of the mold are separable to facilitate the removal of the molded block.

In the machine of the present invention the mold is mounted on a carriage which is movable along tracks on the top of a frame toward and away from a stationary core which projects through the mold into the proper position for molding the desired form of concrete block. The carriage on which the mold is mounted is of such a size that when the mold is in filling position the carriage entirely covers the tracks on which it moves in order to keep concrete from falling on the tracks and hardening there to prevent the free movement of the carriage. When the mold is moved away from the fixed core to withdraw the core from the mold and permit the molded block to be removed from the mold, it is desirable that some means be provided for limiting the distance to which the mold may be withdrawn and to hold the mold and carriage from tipping. For this purpose a combined stop and hold-down has been fixed to the carriage and co-operates with the frame on which the carriage moves. The various parts of the mold have been connected in a novel manner in order that the molded block may be easily and quickly removed from the mold. A combined latch and handle has been mounted on the mold to retain the parts of the mold in closed position when the mold is being filled and to enable the parts of the mold to be easily spread when it is desired to remove the block. Novel hinges which connect the parts of the mold with one another and enable the mold to be spread have been designed to retain the parts in a desired position when the mold is opened and the parts spread in order to facilitate the removal of the block.

Other objects and features of the invention will more fully appear from the following description and the accompanying drawings and will be particularly pointed out in the claims.

The drawings illustrate in perspective, elevation, and detail a preferred form of construction of the concrete block molding machine embodying the broad principles of the invention.

In the drawings:

Fig. 1 is a side elevation of the machine with the mold withdrawn from the core;

Fig. 2 is a plan view of Fig. 1;

Fig. 3 is a section through the mold and core when in filling position;

Fig. 4 is a perspective of the back and bottom of the mold showing the manner in which they are connected;

Fig. 5 is a section on line 5—5, Fig. 1;

Fig. 6 is a section on line 6—6, Fig. 1;

Fig. 7 is a section on line 7—7, Fig. 1;

Fig. 8 is a perspective of a modified form of core;

Fig. 9 is a section on line 9—9, Fig. 4;

Fig. 10 is a section on line 10—10, Fig. 4.

As illustrated herein the molding machine comprises a mold 1 mounted on a carriage 2, and a core 3. The carriage is slidably mounted on a frame 4 to permit the mold which it carries to be moved toward and away from the core which is fixedly mounted on another part of the frame. The mold comprises a front 5, sides 6 and 7, back 8, and bottom 9, of which the front is stationary on the carriage, but the bottom, back and sides are hinged thereto in such a manner that they may be swung away from the front as a unit to permit the block being removed from the mold.

The front 5 of the mold is fixed to the carriage in any convenient manner as by means of bolts 10 and 11 and angle iron 12 in the manner shown in the drawing. An opening 13 is formed through the front of the mold and permits the core to pass into the interior of the mold as the mold is moved toward the core into filling position.

The back and bottom of the mold are connected in the manner shown in Figs. 4, 9, and 10 in order to enable bottoms having various contours to be used in the mold which is necessary in case blocks with different front surfaces are to be molded since the shape of the bottom will determine the shape of the front of the block and if a block is desired which has a front molded to resemble artificial stone, the bottom of the mold will of necessity have a contour such that the molded block will have the desired shape. Although any convenient means may be used to connect the back and bottom I prefer to connect them by means of lugs 14 formed on the bottom 9 which engage the edge of the back 8 and lugs 15 formed on the back 8 which engage the edge of the bottom 9 as seen in Figs. 4, 9, and 10.

The back is hinged to the carriage for swinging movement about a horizontal axis from a vertical position to a horizontal position by means of hinge members 16 formed on the back co-operating with hinge members 17 formed on the carriage, said hinge members being connected by a rod 18 or other means.

The sides 6 and 7 of the mold are hinged to the back for swinging movement into the plane of the back in order to give a convenient way of opening the mold and form a table for use when the molded block is being removed from the open mold. To form hinges, apertured ears 19 are fixed to the back and project therefrom and similar apertured ears 20 project from each side for co-operation with the ears projecting from the back. A pintle 21 extends through both sets of ears 19 and 20 to connect the ears. The ears 19 projecting from the back are extended at 22 to form supports for the sides when the sides are in the horizontal position, that is, when they are spread to enable the molded block to be removed from the mold.

The novel means for retaining the mold in closed position and to assist in opening the mold comprises a pair of combined latches and handles 23 pivoted at 24 to the sides of the mold and co-operating with lugs 25 on the front projecting past the sides and lugs 26 projecting from the side near the upper edge thereof. The combined latch and handle is cut at 27 to catch over the lug 25 and retain the mold in closed position. When it is desired to open the mold the hand grips 28 are grasped and the combined latches and handles raised into the dotted line position shown in Fig. 1 in which position they are free from engagement with the lugs 25 and the top of the combined latches and handles engages the lugs 26 so that by a backward pull on the hand grips 28 the entire mold except the front may be swung from a vertical to a horizontal position, as illustrated in Fig. 1 from the full line position to the dotted line position.

One of the features of the present invention is the means to retain the mold in a rectangular shape so that the molded block will be absolutely square which is important if the blocks are to be used in building operations. In order to retain the mold in a rectangular shape parts 29 of the edges of the front are shaped to extend along the sides and parts 30 of the sides are extended to overlie the edges of the front. It is obvious that by the interlocking of the overlying edges on both the front and the sides, the mold is retained in the rectangular shape. The parts 29 and 30 of the front and sides are designed in any suitable manner so that the parts 30 of the sides may move past the parts 29 on the front in order that the sides, back, and bottom of the mold may be swung about the horizontal axis away from the front to remove the block from the mold. In order to permit this swinging movement in the molding machine illustrated herein grooves 31 have been cut in the front so that the parts 30 may move through the grooves when the mold is swung about the horizontal axis. The usual plate 32 is placed adjacent the back of the mold in order to enable the molded block to be removed from the mold and the back has been cut away at 33 in order that the operator of the machine may get his hands in under the plate to remove the plate and the molded block.

The frame which supports the mold has pairs of upright supports 34 and 35, and 36 and 37 and girders 38 and 39 joining the supports. The girders have parallel tops forming tracks leading to one pair of supports 36 and 37 which are elongated for purposes to be described hereinafter. It is on the top of these girders that the carriage 2 is supported and moves. The carriage has shoes 40 freely resting on the tracks and, as shown in Fig. 1, the shoes cover extended portions of the tracks so that when the mold is in filling position the track is entirely covered in order that particles of the concrete mixture will not lodge on the tracks and harden there to prevent the carriage from moving freely along the tracks when it is desired to bring the mold and core into co-operating position. The shoes 40 have grooves 41 cut therein for co-operation with the tops of the girders 38 to retain the carriage on the girders. The rear end of the carriage has wings 42 and 43 extending on both sides of the carriage in order that when the mold is swung into the horizontal position and its sides spread the wings of the carriage may assist the projections 22 in supporting the extending sides. Pairs of lugs 44 and 45 stand up from the carriage to support the bottom of the mold in the correct position when the mold is closed and similar lugs 46, 47, and 48 stand up from the rear of the carriage to hold the back and sides when the mold is in horizontal position with the sides spread.

Tie members 49 and 50 connect the pairs of upright supports 34 and 35, and 36 and 37 to give a rigid structure.

The means for limiting the distance to which the carriage may be withdrawn and for preventing tilting of the carriage when in withdrawn position is preferably a U-shaped member 51 secured to the carriage and embracing the tie member 50. It is obvious that when the mold is withdrawn from the core, the bend 52 of the U-shaped member engages the tie member 50 and prevents further movement of the carriage and mold and also that the lower part 53 of the U-shaped member engages the lower part of the tie member 50 to prevent the carriage from tilting upwardly when in the withdrawn position.

The supports 36 and 37 are elongated to extend upwardly past the girders in order to support the core and also to support a tool bench 54. A plate 55 is removably fastened by means of bolts 56 to the upper part of the elongated supports 36 and 37 and supports the core over the plane of the girders. This plate is made removable in order that cores of different types may be used in conjunction with the mold. If the core shown in Figs 1, 2, and 3 is to be used the core is held on the plate by means of a bolt 57 which extends from the outer end of the core through the center thereof and projects through the plate 55 and is retained thereon by means of a nut 58 screwed onto the threaded end of the bolt. A positioning plate or boss 59 is used to center the core if it has such a form as that shown in Fig. 3.

At times it may be desirable to mold blocks in which the openings caused by the cores do not extend entirely through the block. A block of this character may be easily molded in the present machine by stopping the mold in its movement toward the supports 36 and 37 in Fig. 1 at such a point that the end of the core is spaced from the plate 32. A solid plate is placed in the core instead of the apertured plate shown in Fig. 3 and the concrete mixture is poured into the mold. In order to limit the distance to which the mold may be moved a limiting means is interposed between the front of the mold and the upright supports 36 and 37 in such a position that it engages the front of the mold and prevents further movement of the mold toward the supports. This means is preferably an iron angle bar 60 removably secured at its ends by means of bolts 61 to the supports 36 and 37 and extending across the machine between the supports. The angle bar has one leg 62 extending horizontally toward the front of the mold in such a position that when the mold is moved up into filling position the front of the mold comes in contact with the edge of the leg and further forward movement of the mold is prevented. The angle bar is removable in order that it may be entirely removed from the machine when a block having openings extending entirely therethrough is desired or other angle irons having longer or shorter legs bay be substituted in place thereof to space the back of the mold various distances from the end of the core. The angle iron has only been shown on Fig. 1 in order not to complicate the showing in the drawing as it is an accessory which may or may not be used in conjunction with the molding machine.

The character of the block molded is determined by the shape of the core used. Thus if the core shown in Figs. 1, 2, and 3 is used a single block with two openings therein is made. Other types of blocks may be wanted, however, and the molding machine is adapted to mold a block of any type and any size within the limits of the particular machine. For instance if it is desired to use the mold to form a plurality of separate small blocks the core shown in Fig. 8 may be used in place of that shown in Figs. 1, 2, and 3. In order to use the modified form of core the plate 55 is removed from the upper parts of the supports and another plate 63 having a plurality of thin fins or dividing portions 64 fastened thereon is bolted to the supports 36 and 37 instead of the plate 55. It is obvious that if the modified form of core is used, a modified form of front for the mold must also be used.

The tool bench 54 is supported by the elongated supports and extends therefrom in a direction opposite to the core. The tool bench may conveniently be made of angle irons 65 fastened to the tops of the elongated supports 36 and 37 and having turned up ends 66 to retain the tools on the bench. Cross bars 67 may join the angle irons 65 in order to form a grating on which the tools or other implements used in connection with the molding machine may be placed. The tool bench may be strengthened by means of bars 68 appropriately placed.

Any number of auxiliary tie rods 69 may be used to strengthen the frame of the machine and it may be supported on any suitable base. I have shown the base as being composed of angle irons 70.

The entire molding machine may be made of any suitable material. For obvious reasons I prefer to make the frame of the machine of angle irons, for the reason that they may be conveniently handled and worked, and if angle bars are used as the girders, the top of the bars will form the track on which the mold moves. The mold itself may be made of cast metal or any other material usually used in molding machines. It is obvious that in a machine of this character many changes may be made, and the drawings and descriptoin given herein are to be used as illustrative only. It is therefore desired that the invention be construed as broadly as the limitations in the claims, taken in conjunction with the prior art, may allow.

Having thus described the invention, what is claimed as new, and desired to be secured by Letters Patent, is:

1. A concrete block molding machine comprising a frame, tracks on the frame, a stationary core, a movable mold and a carriage supporting the mold slidable along the tracks to bring the mold and core into co-operating position and of such a size that when the core is in place in the mold the carriage completely covers and protects the tracks throughout their lengths whereby when the mold is being filled the tracks are covered to prevent concrete from depositing thereon.

2. A concrete block molding machine comprising a frame having girders with parallel tops forming tracks, a core supported on the frame, a mold having a front with an opening therein through which the core projects, a carriage for supporting the mold slidable along the tracks to bring the mold and core into co-operating position and of such a size that when the core is in place in the mold the carriage completely covers and protects the tracks throughout their lengths whereby when the mold is being filled the tracks are covered to prevent concrete from depositing thereon.

3. In a concrete block molding machine having a frame with girders with parallel tops forming tracks and a core supported on the frame, a mold having a back, two sides and a bottom hinged for swinging movement about a horizontal axis, a carriage supporting the mold to which the mold is hinged slidable along the tracks to bring the mold and core into co-operating position, and a front for the mold having an opening through which the core projects fixed to the carriage in a position to close the mold when in filling position and to remain stationary when the back, sides and bottom of the mold are swung about the horizontal axis.

4. A concrete block molding machine comprising a frame having tracks, a stationary core and mold having a front with an opening therein through which the core projects, a carriage for supporting the mold slidable along the tracks to withdraw the mold from the core, and means for limiting the distance to which the carriage may be withdrawn and for preventing tilting of the carriage when in withdrawn position.

5. A concrete block molding machine comprising a frame having tracks, a stationary core, a mold having a front with an opening therein through which the core projects, a carriage for supporting the mold slidable along the tracks to withdraw the mold from the core and a combined stop and hold-down member secured to the carriage and co-operating with the frame for limiting the distance to which the carriage may be withdrawn and for preventing the tilting of the carriage when in withdrawn position.

6. A concrete block molding machine comprising a frame having tracks and pairs of co-operating supports, a tie member joining a pair of supports, a core supported by the supports, a mold having a front with an opening therein through which the core projects, a carriage for supporting the mold slidable along the tracks to withdraw the mold from the core, and a U-shaped member secured to the carriage and embracing the tie member for limiting the distance to which the carriage may be withdrawn and for preventing tilting of the carriage when in withdrawn position.

7. A concrete block molding machine comprising a frame having pairs of upright supports and girders with parallel tops forming tracks joining the supports, a core supported by the supports, a mold having a front with an opening therein through which the core projects, a carriage for supporting the mold slidable along the tracks to withdraw the mold from the core, and means for limiting the distance to which the carriage may be withdrawn and for preventing tilting of the carriage when in withdrawn position.

8. A concrete block molding machine comprising a frame, a carriage movably supported on the frame having wings extending on both sides of the carriage, a separable mold having a back hinged to the carriage for movement about a horizontal axis from a vertical position to a horizontal position, and parallel sides hinged to the back for swinging movement into the plane of the back and adapted to be supported when in horizontal position by said wings.

9. A concrete block molding machine comprising a frame, a carriage supported on the frame, a mold having two parallel sides, a back and a bottom hinged to the carriage for movement about a horizontal axis, and a front for the mold fixed in position on the carriage to close the end of the mold, a lug on the front projecting past the sides, a lug projecting from the side near the upper edge thereof, and a combined latch and handle pivotally mounted on a side to engage the lug on the front to hold the mold in closed position and when disengaged from the lug on the front to engage the lug on the side to enable the mold to be swung about the horizontal axis.

10. A concrete block molding machine comprising a frame, a carriage supported on the frame, a mold having two parallel sides, a back and a bottom hinged to the carriage for movement about a horizontal axis and a front for the mold fixed in position on the carriage to close the end of the mold, parts of the edges of the front being shaped to extend along the sides and parts of the sides being extended to overlie the edges of the front, whereby the mold is retained in a rectangular shape but the sides, back and bottom may be swung about the horizontal axis away from the front to remove the block from the mold.

11. A concrete block molding machine comprising a frame, a carriage movably supported on the frame, a separable mold having a back hinged to the carriage for movement about a horizontal axis from a vertical position to a horizontal position, apertured ears projecting from the back, parallel sides, apertured ears projecting from a side for co-operation with the ears projecting from the back to form hinges permitting the sides being swung into the plane of the back, the ears projecting from the back being extended to form supports for the sides when in horizontal position.

12. A concrete block molding machine comprising a frame having tracks, a stationary core, a mold having a front with an opening therein through which the core projects, a carriage for supporting the mold having shoes freely resting on the tracks and covering extended portions thereof and means for limiting the distance to which the carriage may be withdrawn and for preventing tilting of the carriage when in withdrawn position.

In testimony whereof, I have signed my name to this specification.

LOUIS CAPUTO.